(12) United States Patent
Cunningham et al.

(10) Patent No.: US 12,091,042 B2
(45) Date of Patent: Sep. 17, 2024

(54) METHOD AND SYSTEM FOR TRAINING AN AUTONOMOUS VEHICLE MOTION PLANNING MODEL

(71) Applicant: FORD GLOBAL TECHNOLOGIES, LLC, Dearborn, MI (US)

(72) Inventors: Christopher Cunningham, Pittsburgh, PA (US); Maria Jahja, Pittsburgh, PA (US)

(73) Assignee: Ford Global Technologies, LLC, Dearborn, MI (US)

(*) Notice: Subject to any disclaimer, the term of this patent is extended or adjusted under 35 U.S.C. 154(b) by 531 days.

(21) Appl. No.: 17/391,099

(22) Filed: Aug. 2, 2021

(65) Prior Publication Data
US 2023/0037071 A1 Feb. 2, 2023

(51) Int. Cl.
*B60W 60/00* (2020.01)
*B60W 50/14* (2020.01)
(Continued)

(52) U.S. Cl.
CPC .......... *B60W 60/001* (2020.02); *B60W 50/14* (2013.01); *G01C 21/3453* (2013.01);
(Continued)

(58) Field of Classification Search
CPC ............... B60W 60/001; B60W 50/14; B60W 2050/146; B60W 2420/403;
(Continued)

(56) References Cited

U.S. PATENT DOCUMENTS 9,248,834 B1 * 2/2016 Ferguson .......... B60W 50/0097
10,649,464 B2   5/2020 Gray
(Continued)

FOREIGN PATENT DOCUMENTS

EP    3722908 A1   10/2020

OTHER PUBLICATIONS

Acerbo, F.S, "Supervised and Imitation Learning in Autonomous Vehicle Driving", Rel. Stefano Alberto Malan. Politecnico di Torino, Corso di laurea magistrale in Mechatronic Engineering (Ingegneria Meccatronica), 2019, available at http://webthesis.biblio.polito.it/id/eprint/13101 (2 pages).
(Continued)

*Primary Examiner* — Ian Jen
*Assistant Examiner* — Renee LaRose
(74) *Attorney, Agent, or Firm* — Frank A. MacKenzie; Brooks Kushman, P.C.

(57) ABSTRACT

Methods and systems for training an autonomous vehicle (AV) motion planning model are disclosed. The system receives a log of data representing objects detected by an AV over time. The system identifies a group of sample times in the log. Each sample time represents a time at which the AV made a choice in response to a state of an object. For each of the sample times, the system will generate candidate trajectories for the AV, and it will output the candidate trajectories on a display. The system will receive a label with a rating for each candidate trajectory. The system will then save, to a data set, each of the candidate trajectories in association with its label and the data from the log for its corresponding sample time. The system may then apply the data set to an AV motion planning model to train the model.

17 Claims, 7 Drawing Sheets

(51) Int. Cl.
    *G01C 21/34*     (2006.01)
    *G06N 20/00*     (2019.01)

(52) U.S. Cl.
    CPC ....... *G06N 20/00* (2019.01); *B60W 2050/146* (2013.01); *B60W 2420/403* (2013.01); *B60W 2420/408* (2024.01)

(58) Field of Classification Search
    CPC ..... B60W 2420/408; B60W 2540/215; B60W 60/00; G01C 21/3453; G06N 20/00; G07C 5/08
    See application file for complete search history.

(56) References Cited

U.S. PATENT DOCUMENTS

| | | | |
|---|---|---|---|
| 10,733,510 | B2 | 8/2020 | Nageshrao et al. |
| 2019/0126472 | A1 | 5/2019 | Tunyasuvunakool et al. |
| 2020/0050198 | A1* | 2/2020 | Donnelly ............... G06Q 50/40 |
| 2020/0089247 | A1 | 3/2020 | Shkurti et al. |
| 2020/0104680 | A1 | 4/2020 | Reed et al. |
| 2020/0216094 | A1 | 7/2020 | Zhu et al. |
| 2020/0247432 | A1* | 8/2020 | Misra ................ B60W 50/0097 |
| 2020/0339116 | A1 | 10/2020 | Xu et al. |
| 2020/0358810 | A1 | 11/2020 | Fellows |
| 2020/0401135 | A1 | 12/2020 | Chen et al. |
| 2021/0182620 | A1 | 6/2021 | Tan et al. |
| 2021/0182995 | A1 | 6/2021 | Cella et al. |
| 2021/0370972 | A1* | 12/2021 | Bagschik ............ B60W 50/045 |
| 2022/0188695 | A1* | 6/2022 | Zhu ........................ G06N 20/00 |

OTHER PUBLICATIONS

Chang, M.F. et al., "Argoverse: 3D Tracking and Forecasting with Rich Maps", arXiv:1911.02620v1 [cs.CV], Nov. 6, 2019 (18 pages).
Rosique, F. et al., "A Systematic Review of Perception System and Simulators for Automous Vehicles Research", (Feb. 2019) Sensors 19(Perception Sensors for Road Applications):648 (30 pages).

* cited by examiner

METHOD AND SYSTEM FOR TRAINING AN AUTONOMOUS VEHICLE MOTION PLANNING MODEL

BACKGROUND

Autonomous vehicle (AV) motion planning systems use a large number of parameters to control operation of the AV. Determining the values at which each parameter should be set becomes a computationally challenging problem, as the number of parameters increases, especially in real-world environments where the AV moves and encounters other actors in its environment.

To help address this, AV motion planning models can be pre-trained using imitation learning systems in which the model is trained to imitate behavior that would be expected of a competent human driver. However, imitation learning methods are limited by the amount of training data available. In addition, the range of possible scenarios that a vehicle may encounter is limitless, and it is not possible for a vehicle to be pre-trained to assess every possible situation that it may encounter in the real world.

AVs also face challenges when required to choose between options that are all less than fully desirable. For example, when sitting at a stop light another vehicle may approach the AV from behind in a manner that suggests that the other vehicle will rear-end the AV at low speed. The AV may be faced with a choice between (a) moving forward to avoid the rear-end collision but tapping the bumper of a vehicle in front of the AV, or (b) remaining still and getting rear-ended. Very little real-world data will be available to train the model on such situations, and it is impractical to collect it even on closed course test tracks, as doing so would require subjecting the AV to a collision scenario.

This document describes methods and systems that are directed to addressing the problems described above, and/or other issues.

SUMMARY

In various embodiments, methods and systems for training an autonomous vehicle motion planning model are disclosed. The system will include a processor that receives a data log comprising data representing one or more objects detected by an autonomous vehicle (AV) over a time period. The processor will identify a group of sample times in the data log, in which each of the sample times represents a time at which a motion planning system of the AV made a choice in response to a state of one or more of the objects. For each of the sample times, the system will generate a plurality of candidate trajectories for the AV, and it will output the plurality of candidate trajectories on a display device. The system will receive, via a user interface, a label for each of the candidate trajectories, wherein the label for each candidate trajectory includes a rating for that candidate trajectory. The system will then save, to a data set, each of the candidate trajectories in association with its label and the data from the log for its corresponding sample time. The system may then apply the data set to an AV motion planning model to train the AV motion planning model.

In some embodiments, before receiving the data log, a perception system of the AV will use sensors to collect the data representing the one or more objects in a scene as the AV travels through the scene. The system may generate the data log from the collected data.

In other embodiments, before receiving the data log the system may using a simulation system to generate the data representing the one or more objects in a simulated scene that includes the AV. The system may then apply the simulated scene to the motion planning model to generate simulated responses of the AV to the states of one or more of the objects.

In some embodiments, when the system receives, via a user interface, a request to play the data log, the system may cause the display device to play a scene that includes the AV moving along a route and one or more of the actors. The system may pause the scene at one of the sample times and output the plurality of candidate trajectories while the pausing occurs. The system may resume the scene after receiving the labels for the plurality of candidate trajectories.

In some embodiments, the system may receive, via the user interface, a label, a loss term for at least one of the candidate trajectories.

In some embodiments, the system may generate a loss value for each of the candidate trajectories.

In some embodiments, when applying the data set to an AV motion planning model to train the AV motion planning model, the system may use a cost function to train the AV motion planning model to minimize the cost function or maximize a value function, where the value is a function of a cost.

In some embodiments, before outputting the plurality of candidate trajectories on the display device, the system may use one or more parameters detected in the scene to generate proposed labels for at least some of the candidate trajectories, and the system may present the proposed labels on the display device for user acceptance or rejection. The one or more parameters may include, for example, a sound emitted by another actor in the scene.

In some embodiments, the one or more objects comprise a traffic signal, and the state of the traffic signal comprises a traffic light state. In other embodiments, the one or more objects comprise a moving actor, and the state of the moving actor comprises a predicted trajectory.

In some embodiments, an AV motion planning system may use using the trained AV motion planning model to generate a real-world trajectory for a vehicle. An AV control system may then cause the vehicle to follow the real-world trajectory. The processor may then receive feedback which includes a rating of the real-world trajectory, and it may save the feedback to the data set to yield an updated data set, The system may then use the updated data set to refine training of the AV motion planning model.

DETAILED DESCRIPTION

As used in this document, the singular forms "a," "an," and "the" include plural references unless the context clearly dictates otherwise. Unless defined otherwise, all technical and scientific terms used herein have the same meanings as commonly understood by one of ordinary skill in the art. As used in this document, the term "comprising" (or "comprises") means "including (or includes), but not limited to." Definitions for additional terms that are relevant to this document are included at the end of this Detailed Description.

Figure 1:
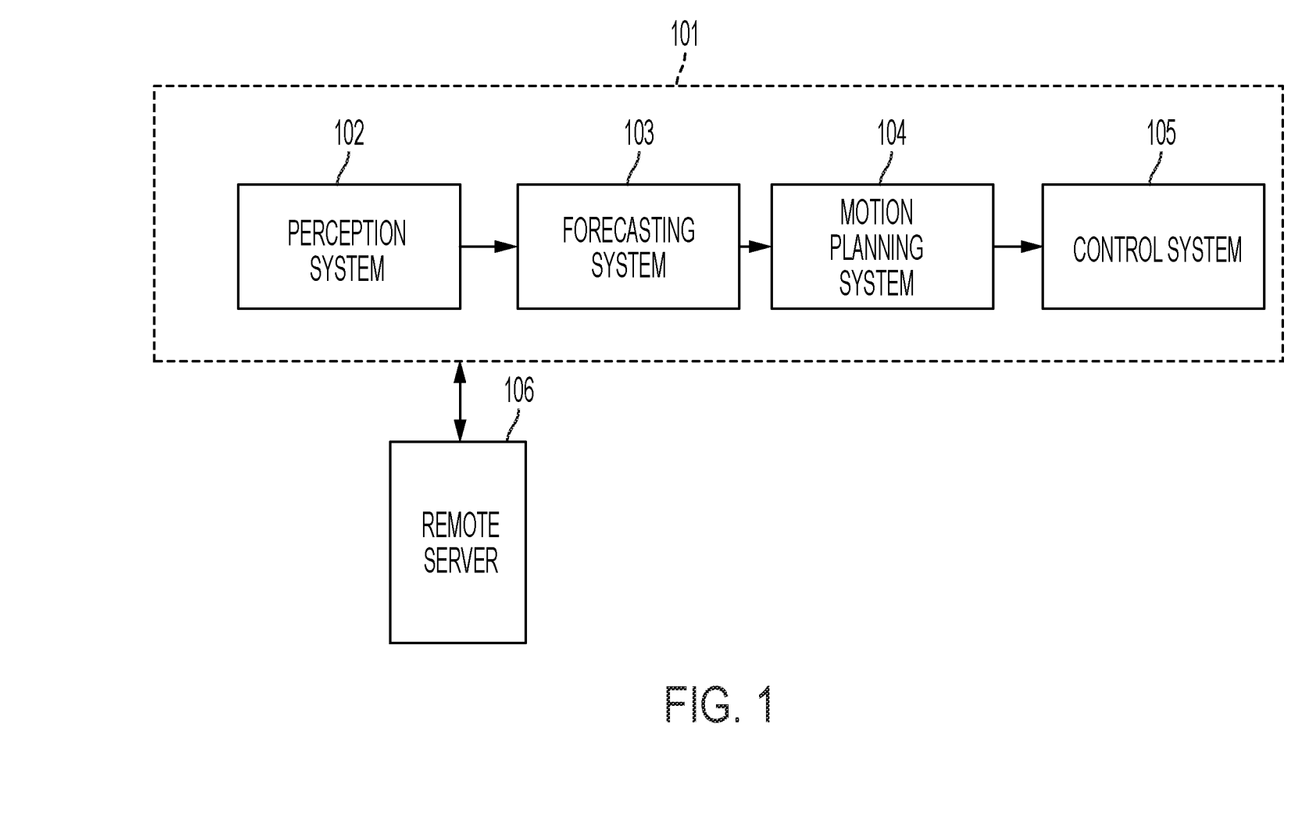
FIG. 1 illustrates example subsystems of an autonomous vehicle.

Before describing the details of the motion planning model training process that is the subject of this document, it is useful to provide some background information about autonomous vehicle (AV) systems. FIG. 1 shows a high-level overview of AV subsystems that may be relevant to the discussion below. Specific components within such systems will be described in the discussion of FIG. 6 later in this document. Certain components of the subsystems may be embodied in processor hardware and computer-readable programming instructions that are part of the AV's on-board computing system 101. The subsystems may include a perception system 102 that includes sensors that capture information about moving actors and other objects that exist in the vehicle's immediate surroundings. Example sensors include cameras, LiDAR sensors and radar sensors. The data captured by such sensors (such as digital image, LiDAR point cloud data, or radar data) is known as perception data.

The perception system may include one or more processors, and computer-readable memory with programming instructions and/or trained artificial intelligence models that, during a run of the AV, will process the perception data to identify objects and assign categorical labels and unique identifiers to each object detected in a scene. Categorical labels may include categories such as vehicle, bicyclist, pedestrian, building, and the like. Methods of identifying objects and assigning categorical labels to objects are well known in the art, and any suitable classification process may be used, such as those that make bounding box predictions for detected objects in a scene and use convolutional neural networks or other computer vision models. Some such processes are described in Yurtsever et al., "A Survey of Autonomous Driving: Common Practices and Emerging Technologies" (arXiv Apr. 2, 2020).

The vehicle's perception system 102 may deliver perception data to the vehicle's forecasting system 103. The forecasting system (which also may be referred to as a prediction system) will include processors and computer-readable programming instructions that are configured to process data received from the perception system and forecast actions of other actors that the perception system detects.

The vehicle's perception system, as well as the vehicle's forecasting system, will deliver data and information to the vehicle's motion planning system 104 and control system 105 so that the receiving systems may assess such data and initiate any number of reactive motions to such data. The motion planning system 104 and control system 105 include and/or share one or more processors and computer-readable programming instructions that are configured to process data received from the other systems, determine a trajectory for the vehicle, and output commands to vehicle hardware to move the vehicle according to the determined trajectory. Example actions that such commands may cause include causing the vehicle's brake control system to actuate, causing the vehicle's acceleration control subsystem to increase speed of the vehicle, or causing the vehicle's steering control subsystem to turn the vehicle. Various motion planning techniques are well known, for example as described in Gonzalez et al., "A Review of Motion Planning Techniques for Automated Vehicles," published in *IEEE Transactions on Intelligent Transportation Systems*, vol. 17, no. 4 (April 2016).

During deployment of the AV, the AV receives perception data from one or more sensors of the AV's perception system. The perception data may include data representative of one or more objects in the environment. The perception system will process the data to identify objects and assign categorical labels and unique identifiers to each object detected in a scene.

Figure 2:
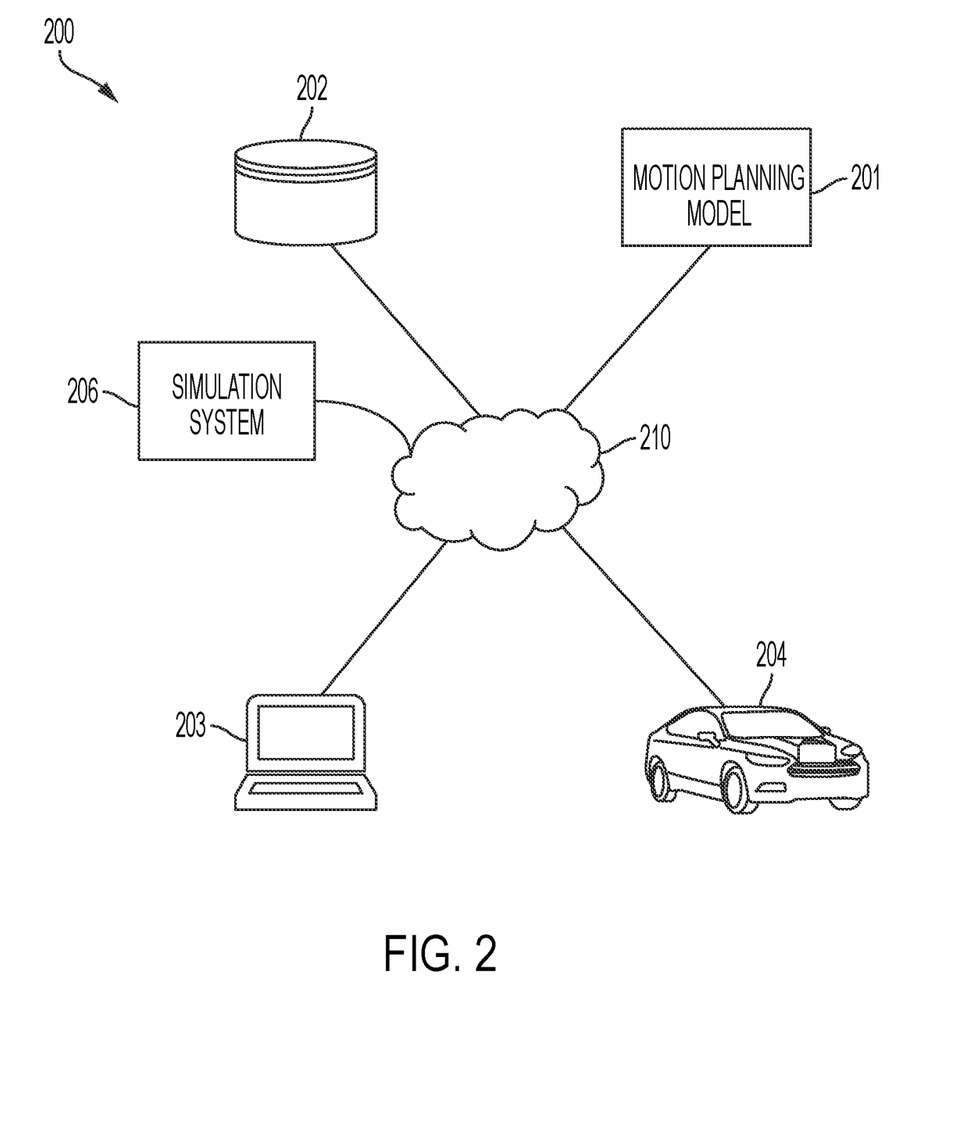
FIG. 2 is a block diagram illustrating example components of a system for training an AV motion planning model.

FIG. 2 is a block diagram illustrating example components of a system 200 for training a motion planning model. The system 200 includes a server or other computing device 201 containing a processor and memory that stores a machine learning model that includes a motion planning model. One or more AVs 204 include sensors that operate to collect data that is stored in data store 202. A data labeling system 203 is a computing device having a display and a user interface that a user may use to example data from the data store 202 and label the data for use in training the machine learning model. Optionally, the system 200 may include a simulation system 206 that is a computing system containing programming instructions and data sets that operate to generate simulated AV perception data. Example simulation systems include those known as PaTAVITT, CarSim, dSpace GmbH and CAT Vehicle, using data sets such as Argoverse 3D Tracking Dataset and the Argoverse Motion Forecasting dataset. (See, for example: (1) Rosique et al., "A Systematic Review of Perception System and Simulators for Autonomous Vehicles Research", published in Sensors February 2019; and (2) Argoverse: 3D Tracking and Forecasting with Rich Maps, published Nov. 6, 2019.)

Various components of the system 200 may communicate with each other over wireless and/or wired communication links via a communications network 210 such as, without limitation, Internet, VPNs, Intranets, WAN, P2P networks, cellular networks, or other forms of network. Example protocols that can be leveraged for such communications include HTTP, HTTPS, SSL, SSH, TCP/IP, UDP/IP, FTP, SCP, WSDL, SOAP, or other types of well-known protocols. It should be appreciated that, although such protocols can be leveraged, it is contemplated that the data exchanged among the devices in the ecosystem/system will be further packaged for easy transport and consumption by the computing devices. The communications network may also implement protocols for secure communication such as an SSL (secure socket layer) or TLS layer (transport layer security) cryptographic protocol.

The components shown in FIG. 2 may be separate components as shown, or any or all of them may be integrated together. For example, any or all of data store 202, data labeling system 203, or simulation system 206 may be components of computing device 201. In addition, the computing device 201 that contains the motion planning model may be part of the AV 204. Alternatively, the motion planning model may be trained on a separate computing device 201 (as shown), and the trained motion planning model may then be installed on the AV 204 for use in planning trajectories of the AV.

In addition, although only a single and data labeling system 203 and AV 204 are shown, in practice multiple data labeling systems and AVs may be employed in the system. In some embodiments, the system 200 may use training data to train one or more implementations of machine learning algorithms such as, without limitation, Google®'s Artificial Intelligence including TensorFlow™, OpenAI™, Prediction IO™, Shogun™, WEKA, or Mahout™, Matlab, Amazon's Machine Learning, Microsoft's Azure Machine Learning, and SciKit-Learn, or the like. A machine learning algorithm may include different types of algorithms including implementations of a classification algorithm, a neural network algorithm, a regression algorithm, a decision tree algorithm, a clustering algorithm, a genetic algorithm, a supervised learning algorithm, a semi-supervised learning algorithm, an unsupervised learning algorithm, a deep learning algorithm, or other types of algorithms. Each algorithm can include a wide variety of possible model instructions that define the conditions under which training occurs. For example, the conditions could include a number of iterations or epochs to execute on the training data, learning rates, convergence requirements, time limits for training, initial conditions, sensitivity, specificity or other types of conditions that are required or optional. A user of data labeling system 203 may provide hyperparameters that define how training is to be performed for the machine learning algorithm. The hyperparameters may be revised based on evaluation metrics for updating a trained machine learning model and/or for fine tuning (discussed below).

Figure 3:
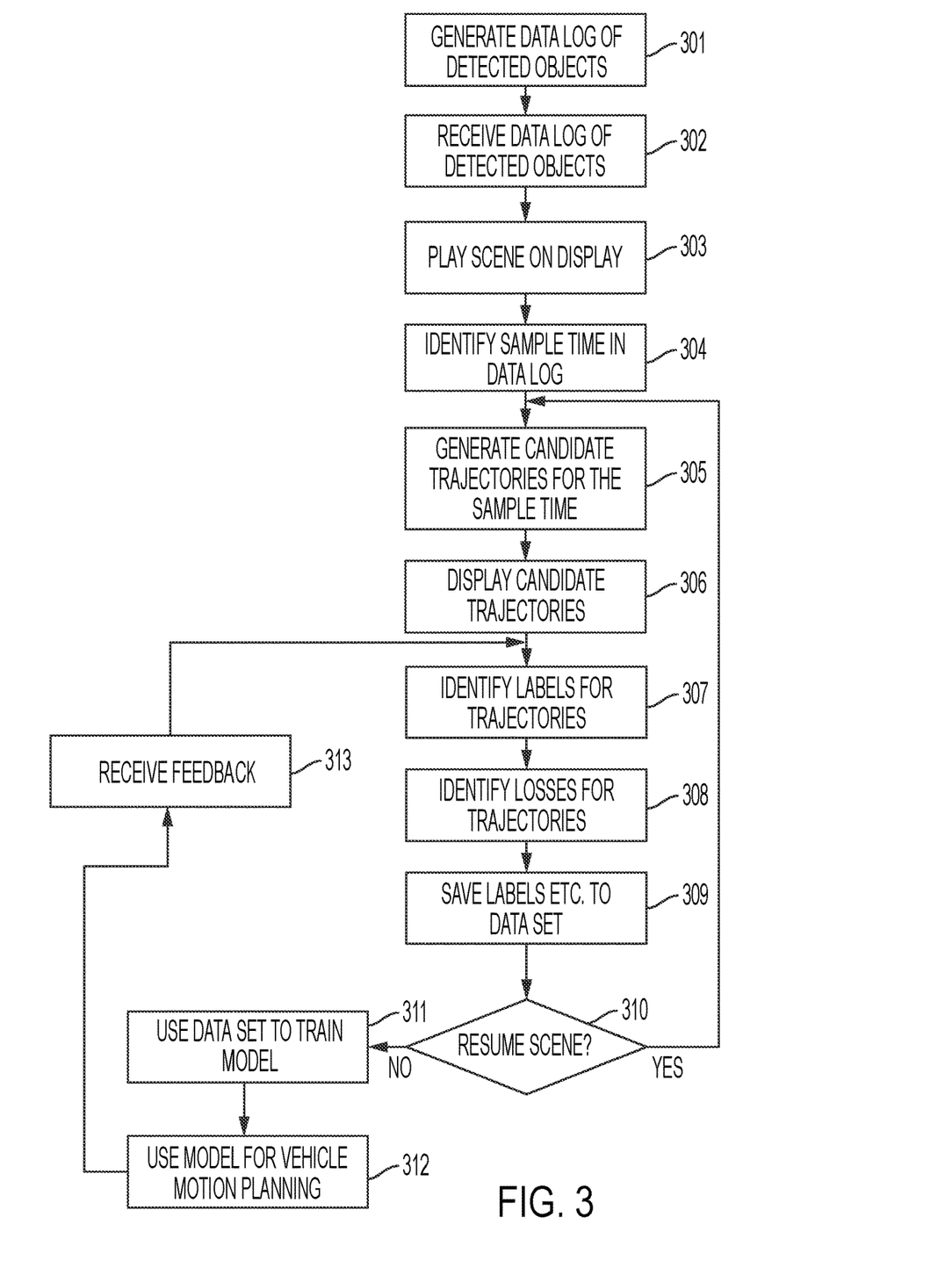
FIG. 3 is a flow diagram illustrating a process of training an AV motion planning model.

FIG. 3 illustrates a process for training an AV motion planning model. At 301 an AV will generate a data log that includes parameters for one or more objects that an AV's perception system received over a time period. Step 301 is optional, as in some embodiments a simulation system (such as simulation system 206 in FIG. 2) may generate the parameters for one or more simulated objects that a hypothetical AV could detect, along with simulated responses of the AV to the simulated objects, in a scene over a time period. Either way, at 302 a data labeling system (such as system 203 of FIG. 2) will receive a data log that includes parameters for one or more objects that an AV's perception system received (or that a simulation system generated) over a time period, all of which represents a scene in which the AV may travel over the time period.

At 303 the system will play the scene on a display device of the data labeling system. This is shown by way of example in FIG. 4, in which the scene includes an intersection of two roads 425, 427. An AV 401 is traveling along one of the roads 427 and detects actors or other objects such as another vehicle 403, pedestrian 404, and traffic signal 407. The system plays the scene on the display device in response to a user request to play the data log, or in response to other triggering actions.

Returning to FIG. 3, at 304 the system will identify a group of sample times in the data log. Each sample time is a time at which the AV's motion planning system makes a choice in response to a detected state of one or more of the objects. A state of an object that is an actor may be a state of movement or non-movement. For example, in FIG. 4 vehicle 403 may be either stopped or moving toward the intersection, while pedestrian 404 may be either standing or walking into or across the crosswalk 423. The possible states of a fixed object the example traffic signal 407 shown may include a state indicating which of the lights of the signal are on (red, yellow or green), and optionally one or more sub-states such as flashing. At 305 the system will generate multiple candidate trajectories for the AV for each sample time. For example, in FIG. 4 the candidate trajectories for AV 401 include a first candidate trajectory 411 in which the AV stops before reaching the crosswalk 423 and a second candidate trajectory 412 in which the AV proceeds into the intersection.

Figure 4:
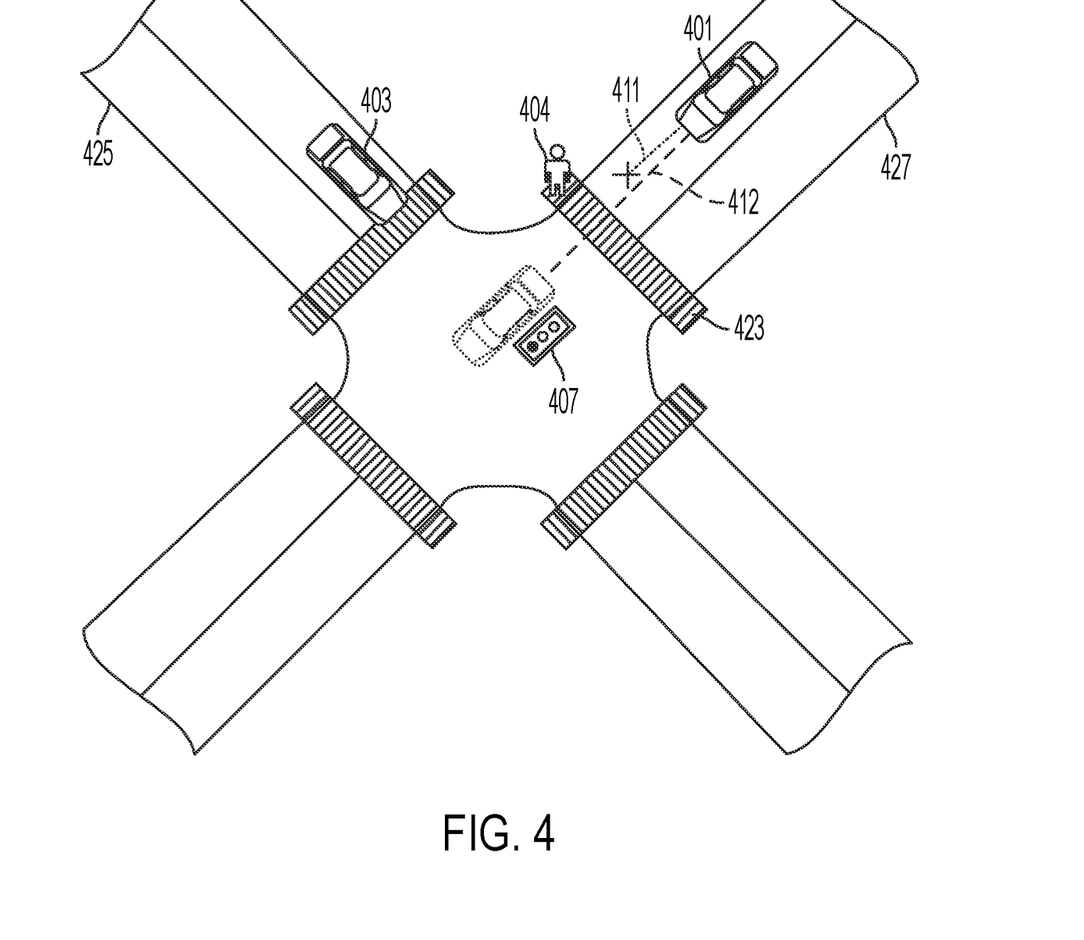
FIG. 4 illustrates an example displayed scene in which an AV is moving and detecting other objects.
Figure 5:
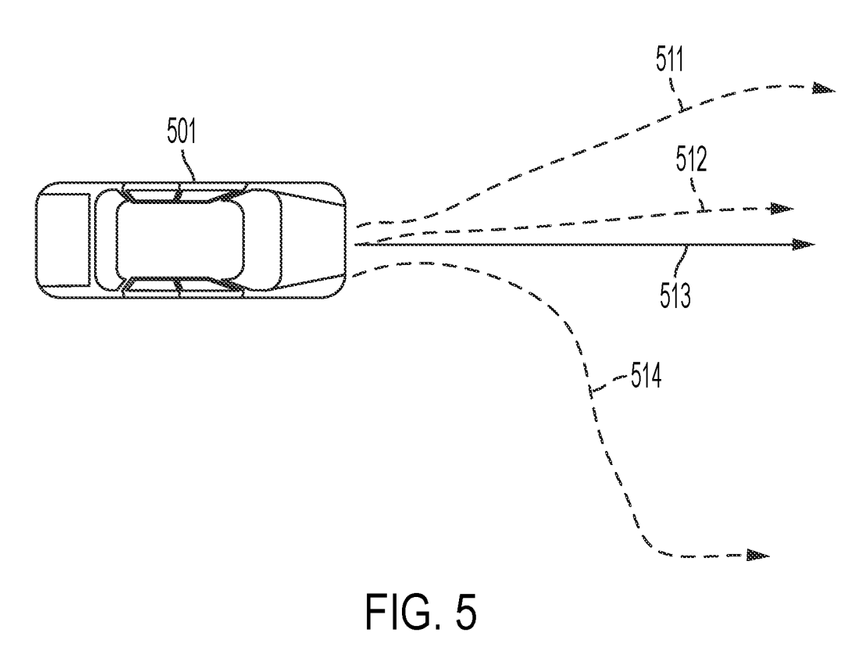
FIG. 5 illustrates an example user labeling process for multiple candidate trajectories.

At 306 the system will display the candidate trajectories on the display device for a user to review, optionally pausing the scene while doing waiting for the user's response. The candidate trajectories may be displayed on a birds-eye view of the scene as shown in FIG. 4, or in another format. For example, FIG. 5 illustrates an example display in which several candidate trajectories 511-514 are presented for an AV 501 in an isolated manner that in which all components of the scene are removed. Optionally, a user may select one of the trajectories using a user interface such as a touch-screen display, microphone, or keyboard or keypad, and in response the system may display certain elements of the scene that most influenced the AV's choice of that candidate trajectory.

Returning to FIG. 3, at 307 the system will identify a label of each candidate trajectory. The label will be one that provides a rating of the candidate trajectory. The rating may be, for example, a rating of indicates whether the user considers the candidate trajectory to be desirable or undesirable, or it may indicate that a particular action is preferable to another referenced action. For example, the label may be a word (such as undesirable/desirable or yes/no) a color (such as red for undesirable/green for desirable), a symbol (such as a thumbs up icon/thumbs down icon), a numeric rating or a letter grade, or another label that rates the trajectory. The system may do this by receiving the label from a user via the user interface, by outputting a proposed label to the user and receiving a user's acceptance or rejection of the label, or by another process. For example, referring to FIG. 5, the user may identify a trajectory 513 as a desirable trajectory and identify trajectories 511, 512 and 514 as undesirable trajectories. The system may alter the visual indicators of at least some of the trajectories so that desirable trajectories 513 are shown in a format that is visually distinct from undesirable trajectories 511, 512 and 514. Example visually distinct indicia include different colors, or the use of solid and dotted lines as shown in FIG. 5. In addition or alternatively, the system may alter the visual presentation of a trajectory after a user has labeled a trajectory so that the display device informs the user of which trajectories are labeled and which trajectories remain to be labeled using different dash patterns, different colors, or other visually distinct characteristics.

Optionally, when identifying the labels at 307 the system may generate a proposed label for at least some of the candidate trajectories and present the proposed labels to the user with the candidate trajectory. The system will apply any parameters of the scene to generate a proposed label. For example, if a candidate trajectory will cause the AV to move less than a minimum distance away from another actor in the scene, or of the candidate trajectory causes another actor in the scene to emit a sound (such as a car horn honk), the system may propose an "undesirable" label for that candidate trajectory. In addition or alternatively, the system may generate a default label (such as "desirable" or "undesirable") for one or more candidate trajectories, and the system may apply the default label to that trajectory unless it receives a user's command to change the label.

Optionally, when receiving the label, at 308 the system also may generate loss values for any or all of the candidate trajectories. A loss value may be a value that provides a measurable indicator of a rating (such as a level of undesirability), and a relatively higher loss value will mean a relatively lower rating (i.e., a higher level of undesirability). Since a machine learning model such as a motion planning model will have a goal of generating trajectories that minimize a cost function or conversely that maximize a value function, the loss value can help the model distinguish between trajectories that are moderately undesirable and those that are extremely undesirable. The system may receive the loss values from a user via the user interface, or it may automatically generate the loss value for a candidate trajectory that is labeled as undesirable using a process such as by measuring a difference between that candidate trajectory and a trajectory that is labeled as desirable.

At 309 the system will save the labels and loss values to a data set. At 310 if additional sample times are available in the scene the system may return to step 305 and generate new candidate trajectories for the next sample time. Otherwise, at 311 the training process may end, and the system can then input the data set to the motion planning model to train the model. At 312 an AV may then use the motion planning model to plan its motion using processes such as those described above in FIG. 1.

Optionally, the process described above may be used to refine training of the motion planning model after the AV implements the model in the real world. For example, after an AV follows an actual trajectory that the AV generates using the model, at 313 the system may receive feedback on the real-world trajectory and return to step 307 and identify a label for the actual trajectory indicating whether the actual trajectory was desirable or undesirable. The system may receive the label from a user, via a user interface of an in-vehicle or portable electronic device. Alternatively, the system may automatically generate a label based on feedback receive from other input devices, such as via a microphone that detects a horn sound that exceeds a minimum decibel threshold indicating that the horn sound was likely emitted by a nearby vehicle in response to the AV following the trajectory. At 309 system may then save the label and associated data to the data set to yield an updated data set, and at 311 the system may use the updated data set to refine the training of (i.e., to further train) the motion planning model.

Figure 6:
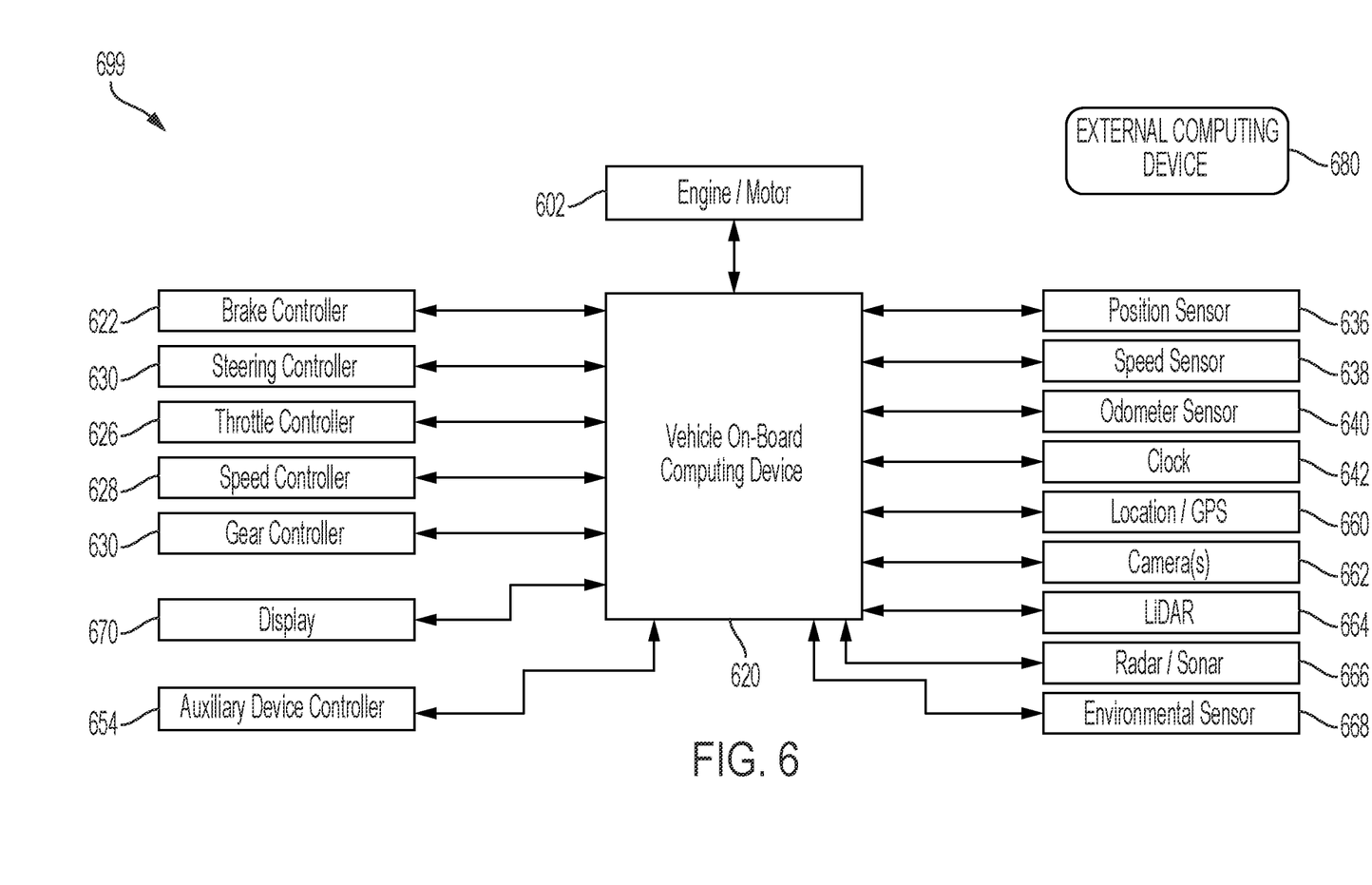
FIG. 6 is a block diagram that illustrates various example elements of an AV.

FIG. 6 illustrates an example system architecture 699 for a vehicle, such as an AV. The vehicle includes an engine or motor 602 and various sensors for measuring various parameters of the vehicle and/or its environment. Operational parameter sensors that are common to vehicles include, for example: a position sensor 636 such as an accelerometer, gyroscope and/or inertial measurement unit; a speed sensor 638; and an odometer sensor 640. The vehicle also may have a clock 642 that the system uses to determine vehicle time during operation. The clock 642 may be encoded into the vehicle on-board computing device, it may be a separate device, or multiple clocks may be available.

The vehicle also will include various sensors that are part of its perception system and that operate to gather information about the environment in which the vehicle is traveling. These sensors may include, for example: a location sensor 660 such as a global positioning system (GPS) device; object detection sensors such as one or more cameras 662; a LiDAR sensor system 664; and/or a radar and or and/or a sonar system 666. The sensors also may include environmental sensors 668 such as a precipitation sensor and/or ambient temperature sensor. The object detection sensors may enable the vehicle to detect moving actors and stationary objects that are within a given distance range of the vehicle 699 in any direction, while the environmental sensors collect data about environmental conditions within the vehicle's area of travel. The system will also include one or more cameras 662 for capturing images of the environment. Any or all of these sensors will capture sensor data that will enable one or more processors of the vehicle's on-board computing device 620 and/or external devices to execute programming instructions that enable the computing system to classify objects in the perception data, and all such sensors, processors and instructions may be considered to be the vehicle's perception system. The vehicle also may receive state information, descriptive information or other information about devices or objects in its environment from a communication device (such as a transceiver, a beacon and/or a smart phone) via one or more wireless communication links, such as those known as vehicle-to-vehicle, vehicle-to-object or other V2X communication links. The term "V2X" refers to a communication between a vehicle and any object that the vehicle may encounter or affect in its environment.

During a run of the vehicle, information is communicated from the sensors to an on-board computing device 620. The on-board computing device 620 analyzes the data captured by the perception system sensors and, acting as a motion planning system, executes instructions to determine a trajectory for the vehicle. The trajectory includes pose and time parameters, and the vehicle's on-board computing device will control operations of various vehicle components to move the vehicle along the trajectory. For example, the on-board computing device 620 may control braking via a brake controller 622; direction via a steering controller 624; speed and acceleration via a throttle controller 626 (in a gas-powered vehicle) or a motor speed controller 628 (such as a current level controller in an electric vehicle); a differential gear controller 630 (in vehicles with transmissions); and/or other controllers.

Geographic location information may be communicated from the location sensor 660 to the on-board computing device 620, which may then access a map of the environment that corresponds to the location information to determine known fixed features of the environment such as streets, buildings, stop signs and/or stop/go signals. Captured images from the cameras 662 and/or object detection information captured from sensors such as a LiDAR system 664 is communicated from those sensors) to the on-board computing device 620. The object detection information and/or captured images may be processed by the on-board computing device 620 to detect objects in proximity to the vehicle 699. In addition or alternatively, the AV may transmit any of the data to an external computing device 680 for processing. Any known or to be known technique for performing object detection based on sensor data and/or captured images can be used in the embodiments disclosed in this document.

In addition, the AV may include an onboard display device 670 that may generate and output interface on which sensor data, vehicle status information, or outputs generated by the processes described in this document are displayed to an occupant of the vehicle. For example, An in-dash display or a portable computing device carried by a vehicle occupant may serve as the device that displays candidate trajectories and receives the user's labels of those trajectories. The display device may include, or a separate device may be, an audio speaker that presents such information in audio format.

In the various embodiments discussed in this document, the description may state that the vehicle or on-board computing device of the vehicle may implement programming instructions that cause the on-board computing device of the vehicle to make decisions and use the decisions to control operations of one or more vehicle systems. However, the embodiments are not limited to this arrangement, as in various embodiments the analysis, decision making and or operational control may be handled in full or in part by other computing devices that are in electronic communication with the vehicle's on-board computing device. Examples of such other computing devices include an electronic device (such as a smartphone) associated with a person who is riding in the vehicle, as well as a remote server that is in electronic communication with the vehicle via a wireless communication network.

Figure 7:
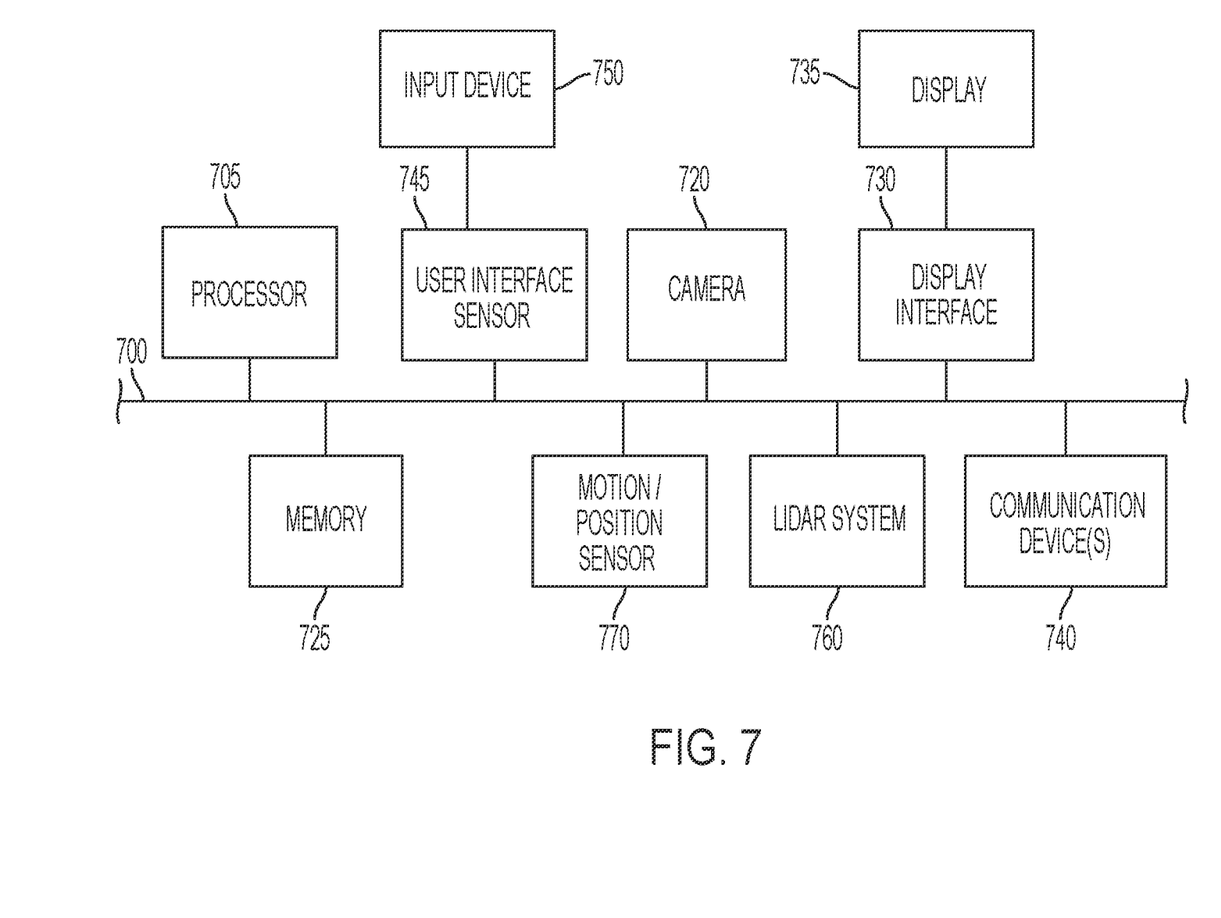
FIG. 7 is a block diagram that illustrates various example elements of a computing system, such as one that is on-board an AV or one that is embodied in a portable electronic device.

FIG. 7 depicts an example of internal hardware that may be included in any of the electronic components of the system, such as internal processing systems of the AV, or a remote server that contains a machine learning model. An electrical bus 700 serves as an information highway interconnecting the other illustrated components of the hardware. Processor 705 is a central processing device of the system, configured to perform calculations and logic operations required to execute programming instructions. As used in this document and in the claims, the terms "processor" and "processing device" may refer to a single processor or any number of processors in a set of processors that collectively perform a set of operations, such as a central processing unit (CPU), a graphics processing unit (GPU), a remote server, or a combination of these. Read only memory (ROM), random access memory (RAM), flash memory, hard drives and other devices capable of storing electronic data constitute examples of memory devices 725. A memory device may include a single device or a collection of devices across which data and/or instructions are stored. Various embodiments may include a computer-readable medium containing programming instructions that are configured to cause one or more processors to perform the functions described in the context of the previous figures.

An optional display interface 730 may permit information from the bus 700 to be displayed on a display device 735 in visual, graphic or alphanumeric format, such as an in-dashboard display system of the vehicle. An audio interface and audio output (such as a speaker) also may be provided. Communication with external devices may occur using various communication devices 740 such as a wireless antenna, a radio frequency identification (RFID) tag and/or short-range or near-field communication transceiver, each of which may optionally communicatively connect with other components of the device via one or more communication system. The communication device(s) 740 may be configured to be communicatively connected to a communications network, such as the Internet, a local area network or a cellular telephone data network.

The hardware may also include a user interface sensor 745 that allows for receipt of data from input devices 750 such as a keyboard or keypad, a joystick, a touchscreen, a touch pad, a remote control, a pointing device and/or a microphone. Digital image frames also may be received from a camera 720 that can capture video and/or still images. The system also may receive data from a motion and/or position sensor 770 such as an accelerometer, gyroscope or inertial measurement unit. The system also may include and receive data via a LiDAR system 760, when used in the context of autonomous vehicles.

The above-disclosed features and functions, as well as alternatives, may be combined into many other different systems or applications. Various components may be implemented in hardware or software or embedded software. Various presently unforeseen or unanticipated alternatives, modifications, variations or improvements may be made by those skilled in the art, each of which is also intended to be encompassed by the disclosed embodiments.

Terminology that is relevant to the disclosure provided above includes:

An "automated device" or "robotic device" refers to an electronic device that includes a processor, programming instructions, and one or more physical hardware components that, in response to commands from the processor, can move with minimal or no human intervention. Through such movement, a robotic device may perform one or more automatic functions or function sets. Examples of such operations, functions or tasks may include without limitation, operating wheels or propellers to effectuate driving, flying or other transportation actions, operating robotic lifts for loading, unloading, medical-related processes, construction-related processes, and/or the like. Example automated devices may include, without limitation, autonomous vehicles, drones and other autonomous robotic devices.

The term "vehicle" refers to any moving form of conveyance that is capable of carrying either one or more human occupants and/or cargo and is powered by any form of energy. The term "vehicle" includes, but is not limited to, cars, trucks, vans, trains, autonomous vehicles, aircraft, aerial drones and the like. An "autonomous vehicle" is a vehicle having a processor, programming instructions and drivetrain components that are controllable by the processor without requiring a human operator. An autonomous vehicle may be fully autonomous in that it does not require a human operator for most or all driving conditions and functions. Alternatively, it may be semi-autonomous in that a human operator may be required in certain conditions or for certain operations, or that a human operator may override the vehicle's autonomous system and may take control of the vehicle. Autonomous vehicles also include vehicles in which autonomous systems augment human operation of the vehicle, such as vehicles with driver-assisted steering, speed control, braking, parking and other advanced driver assistance systems.

A "run" of a vehicle refers to an act of operating a vehicle and causing the vehicle to move about the real world. A run may occur in public, uncontrolled environments such as city or suburban streets, highways, or open roads. A run may also occur in a controlled environment such as a test track.

The term "object," when referring to an object that is detected by a vehicle perception system or simulated by a simulation system, is intended to encompass both stationary objects and moving (or potentially moving) actors, except where specifically stated otherwise by use of the term "actor" or "stationary object."

When used in the context of autonomous vehicle motion planning, the term "trajectory" refers to the plan that the vehicle's motion planning system will generate, and which the vehicle's motion control system will follow when controlling the vehicle's motion. A trajectory includes the vehicle's planned position and orientation at multiple points in time over a time horizon, as well as the vehicle's planned steering wheel angle and angle rate over the same time horizon. An autonomous vehicle's motion control system will consume the trajectory and send commands to the vehicle's steering controller, brake controller, throttle controller and/or other motion control subsystem to move the vehicle along a planned path.

An "electronic device" or a "computing device" refers to a device that includes a processor and memory. Each device may have its own processor and/or memory, or the processor and/or memory may be shared with other devices as in a virtual machine or container arrangement. The memory will contain or receive programming instructions that, when executed by the processor, cause the electronic device to perform one or more operations according to the programming instructions.

The terms "memory," "memory device," "computer-readable medium," "data store," "data storage facility" and the like each refer to a non-transitory device on which computer-readable data, programming instructions or both are stored. Except where specifically stated otherwise, the terms "memory," "memory device," "computer-readable medium," "data store," "data storage facility" and the like are intended to include single device embodiments, embodiments in which multiple memory devices together or collectively store a set of data or instructions, as well as individual sectors within such devices. A computer program product is a memory device with programming instructions stored on it.

The terms "processor" and "processing device" refer to a hardware component of an electronic device that is configured to execute programming instructions, such as a microprocessor or other logical circuit. A processor and memory may be elements of a microcontroller, custom configurable integrated circuit, programmable system-on-a-chip, or other electronic device that can be programmed to perform various functions. Except where specifically stated otherwise, the singular term "processor" or "processing device" is intended to include both single-processing device embodiments and embodiments in which multiple processing devices together or collectively perform a process.

A "machine learning model" or a "model" refers to a set of algorithmic routines and parameters that can predict an output(s) of a real-world process (e.g., prediction of an object trajectory, a diagnosis or treatment of a patient, a suitable recommendation based on a user search query, etc.) based on a set of input features, without being explicitly programmed. A structure of the software routines (e.g., number of subroutines and relation between them) and/or the values of the parameters can be determined in a training process, which can use actual results of the real-world process that is being modeled. Such systems or models are understood to be necessarily rooted in computer technology, and in fact, cannot be implemented or even exist in the absence of computing technology. While machine learning systems utilize various types of statistical analyses, machine learning systems are distinguished from statistical analyses by virtue of the ability to learn without explicit programming and being rooted in computer technology.

A typical machine learning pipeline may include building a machine learning model from a sample dataset (referred to as a "training set"), evaluating the model against one or more additional sample datasets (referred to as a "validation set" and/or a "test set") to decide whether to keep the model and to benchmark how good the model is, and using the model in "production" to make predictions or decisions against live input data captured by an application service. The training set, the validation set, and/or the test set, as well as the machine learning model are often difficult to obtain and should be kept confidential. The current disclosure describes systems and methods for providing a secure machine learning pipeline that preserves the privacy and integrity of datasets as well as machine learning models.

In this document, when relative terms of order such as "first" and "second" are used to modify a noun, such use is simply intended to distinguish one item from another, and is not intended to require a sequential order unless specifically stated.

In addition, terms of relative position such as "front" and "rear", when used, are intended to be relative to each other and need not be absolute, and only refer to one possible position of the device associated with those terms depending on the device's orientation. When this document uses the terms "front," "rear," and "sides" to refer to an area of a vehicle, they refer to areas of vehicle with respect to the vehicle's default area of travel. For example, a "front" of an automobile is an area that is closer to the vehicle's headlamps than it is to the vehicle's tail lights, while the "rear" of an automobile is an area that is closer to the vehicle's tail lights than it is to the vehicle's headlamps. In addition, the terms "front" and "rear" are not necessarily limited to forward-facing or rear-facing areas but also include side areas that are closer to the front than the rear, or vice versa, respectively. "Sides" of a vehicle are intended to refer to side-facing sections that are between the foremost and rearmost portions of the vehicle.

The invention claimed is:

1. A computer-implemented method of training an autonomous vehicle motion planning model, the method comprising:
   receiving a data log comprising data representing one or more objects detected by an autonomous vehicle (AV) over a time period;
   identifying a group of sample times in the data log, in which each of the sample times represents a time at which a motion planning system of the AV made a choice in response to a state of one or more of the objects;
   for each of the sample times, generating a plurality of candidate trajectories for the AV;
   outputting the plurality of candidate trajectories on a display device;
   receiving, via a user interface, a label for each of the candidate trajectories, wherein the label for each candidate trajectory includes a rating for that candidate trajectory;
   saving, to a data set, each of the candidate trajectories in association with its label and the data from the log for its corresponding sample time;
   applying the data set to an AV motion planning model to train the AV motion planning model;
   in response to receiving, via the user interface, a request to play the data log, causing the display device to play a scene that includes the AV moving along a route and one or more of actors;
   pausing the scene at one of the sample times and outputting the plurality of candidate trajectories while the pausing occurs; and
   resuming the scene after receiving the labels for the plurality of candidate trajectories.

2. The method of claim 1 further comprising, before receiving the data log:
   by a perception system of the AV as the AV travels through a scene, using sensors to collect the data representing the one or more objects in the scene; and
   generating the data log from the collected data.

3. The method of claim 1 further comprising, before receiving the data log:
   using a simulation system to generate the data representing the one or more objects in a simulated scene that includes the AV; and
   applying the simulated scene to the motion planning model to generate simulated responses of the AV to the states of one or more of the objects.

4. The method of claim 1 further comprising generating a loss value for each of the candidate trajectories.

5. The method of claim 1, wherein applying the data set to an AV motion planning model to train the AV motion planning model comprises using a cost function to train the AV motion planning model to minimize the cost function or maximize a value function.

6. The method of claim 1 further comprising, before outputting the plurality of candidate trajectories on the display device:
using one or more parameters detected in the scene to generate proposed labels for at least some of the candidate trajectories; and
presenting the proposed labels on the display device for user acceptance or rejection.

7. The method of claim 6, wherein the one or more parameters comprise a sound emitted by another actor in the scene.

8. The method of claim 1, wherein:
the one or more objects comprise a traffic signal; and
the state of the traffic signal comprises a traffic light state.

9. The method of claim 1, wherein:
the one or more objects comprise a moving actor; and
the state of the moving actor comprises a predicted trajectory.

10. The method of claim 1, further comprising:
by an AV motion planning system, using the AV motion planning model to generate a real-world trajectory for a vehicle, and by an AV control system, causing the vehicle to follow the real-world trajectory;
receiving feedback that includes a rating of the real-world trajectory;
saving the feedback to the data set to yield an updated data set; and
using the updated data set to refine training of the AV motion planning model.

11. A system for training an autonomous vehicle motion planning model, the system comprising:
a display device;
a processor; and
a memory containing programming instructions that are configured to instruct the processor to:
receive a data log comprising data representing one or more objects detected by an autonomous vehicle (AV) over a time period,
identify a group of sample times in the data log, in which each of the sample times represents a time at which a motion planning system of the AV made a choice in response to a state of one or more of the objects,
for each of the sample times, generate a plurality of candidate trajectories for the AV,
output the plurality of candidate trajectories on the display device,
receive, via a user interface, a label for each of the candidate trajectories, wherein the label for each candidate trajectory includes a rating for that candidate trajectory,
save, to a data set, each of the candidate trajectories in association with its label and the data from the log for its corresponding sample time,
apply the data set to an AV motion planning model to train the AV motion planning model,
in response to receiving, via the user interface, a request to play the data log, play on the display device, a scene that includes the AV moving along a route and one or more of actors,
pause the scene at one of the sample times and output the plurality of candidate trajectories while the pausing occurs, and
resume the scene after receiving the labels for the plurality of candidate trajectories.

12. The system of claim 11, further comprising a vehicle that includes a perception system that is configured to, as the vehicle travels through a scene:
use sensors to collect the data representing the one or more objects in the scene; an generate the data log from the collected data.

13. The system of claim 11, further comprising additional programming instructions that are configured to cause the processor to:
use a simulation system to generate the data representing the one or more objects in a simulated scene that includes the AV; and
apply the simulated scene to the motion planning model to generate simulated responses of the AV to the states of one or more of the objects.

14. The system of claim 11, further comprising additional programming instructions that are configured to cause the processor to implement one or more of the following;
generate a loss value for each of the candidate trajectories; or
use a cost function to train the AV motion planning model to minimize the cost function.

15. The system of claim 11, further comprising additional programming instructions that are configured to cause the processor to, before outputting the plurality of candidate trajectories on the display device:
use one or more parameters detected in the scene to generate proposed labels for at least some of the candidate trajectories; and
present the proposed labels on the display device for user acceptance or rejection.

16. The system of claim 11, further comprising a vehicle that includes:
a vehicle motion planning system that is configured to use the AV motion planning model to generate a real-world trajectory for a vehicle, and
a vehicle control system that is configured to cause the vehicle to follow the real-world trajectory;
wherein the system further comprises programming instructions that are configured to cause the processor to:
receive feedback that includes a rating of the real-world trajectory,
save the feedback to the data set to yield an updated data set, and
use the updated data set to refine training of the AV motion planning model.

17. A computer program product comprising a memory device that stores programming instructions that are configured to cause a processor to train an autonomous vehicle motion planning model by:
receiving a data log comprising data representing one or more objects detected by an autonomous vehicle (AV) over a time period;
identifying a group of sample times in the data log, in which each of the sample times represents a time at which a motion planning system of the AV made a choice in response to a state of one or more of the objects;
for each of the sample times, generating a plurality of candidate trajectories for the AV; outputting the plurality of candidate trajectories on a display device;
receiving, via a user interface, a label for each of the candidate trajectories, wherein the label for each candidate trajectory includes a rating for that candidate trajectory;

saving, to a data set, each of the candidate trajectories in association with its label and the data from the log for its corresponding sample time;

applying the data set to an AV motion planning model to train the AV motion planning model; model;

in response to receiving, via the user interface, a request to play the data log, causing the display device to play a scene that includes the AV moving along a route and one or more of actors;

pausing the scene at one of the sample times and outputting the plurality of candidate trajectories while the pausing occurs; and resuming the scene after receiving the labels for the plurality of candidate trajectories.

* * * * *